July 16, 1940.  R. O. HAMILL  2,207,732
INDICATING APPARATUS
Filed March 27, 1936  2 Sheets-Sheet 1

R. O. Hamill  INVENTOR.
BY Thomas Howe
ATTORNEY.

July 16, 1940.    R. O. HAMILL    2,207,732
INDICATING APPARATUS
Filed March 27, 1936    2 Sheets-Sheet 2

R. O. Hamill INVENTOR.
BY Thomas Howe
ATTORNEY.

Patented July 16, 1940

2,207,732

UNITED STATES PATENT OFFICE 2,207,732

INDICATING APPARATUS

Ret O. Hamill, Elmhurst, N. Y.

Application March 27, 1936, Serial No. 71,116

13 Claims. (Cl. 235—1)

This invention relates to instruments for indicating or registering measurements and is especially adapted to such instruments employed in connection with the measurement of electrical quantities, but is not limited to such uses.

The invention is also especially adapted for use in connection with the indicating or registering of integrated values in connection with electricity but is not limited to such uses.

The main object of the invention is to provide an instrument whereby the measurements may be registered in a manner improving the facility and accuracy of measuring instruments.

A further object of the invention is to provide a registering or indicating measuring instrument wherein a registration or indication at one time may be preserved notwithstanding the operating parts of the instrument may have proceeded upon a further operation of registering.

A further object of the invention is to provide an instrument of the character described wherein a member is positioned according to the value to be indicated or registered but the indicating or registering means is movable independently thereof although engaging therewith to be positioned to effect the desired registration or indication.

A further object of the invention is to provide an indicating or registering means which is positioned in indicating or registering position by bringing it into positioning engagement with a member operated in accordance with the values measured, the indicating means being brought into such engagement by movement in the same direction in which the said member is operated.

A further object of the invention is to provide a means for moving the indicating means into positioning engagement with the member operated in accordance with the value to be measured which shall be operated to move the indicating means in but one direction only and thereby prevent the error and confusion which might result from movement in the opposite direction.

A further object of the invention is to provide an instrument having a member operated in accordance with the value to be registered and an indicating means adapted to be moved into positioning engagement with said member to indicate the measurement desired, there being a non-positive driving connection to so move the indicating means whereby the indicating means will be located in proper indicating position by the said member even though there is excessive movement of the means for moving the indicating means.

A further object of the invention is to provide automatic means for returning the indicator moving means to initial position thereby insuring the complete movement of said moving means when it is operated and thereby preventing inaccuracy or improper operation.

A further object of the invention is to provide a series of members taking up their position according to the values to be measured and an indicating means corresponding to each of said members and, although movable independently thereof, are positioned thereby to indicate the values to be measured.

A further object of the invention is to provide a common means for moving the several indicating means corresponding to the series of members positioned according to the quantity to be measured.

Other and ancillary objects of the invention will appear hereinafter.

In the accompanying drawings which illustrate the invention:

Figure 2:
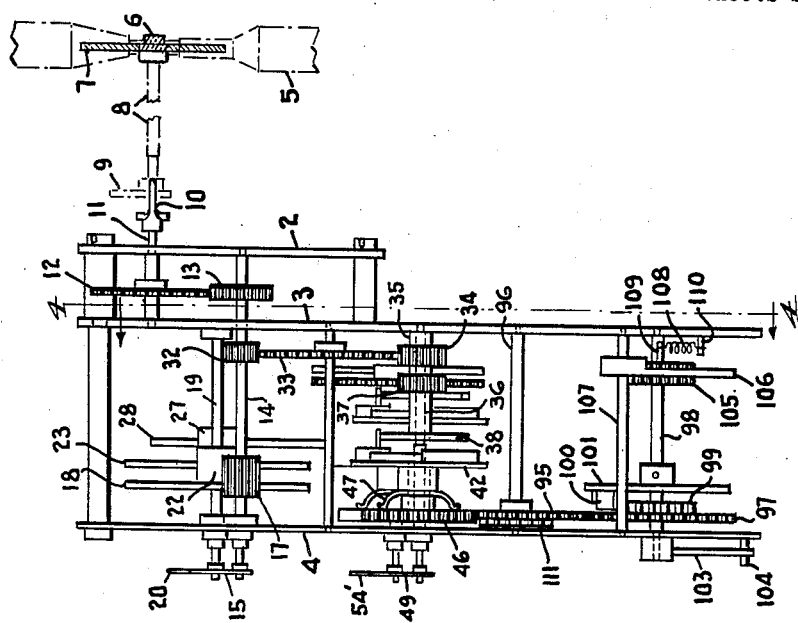
Fig. 2 is a side elevation of the apparatus of Fig. 1.

Referring to the drawings, there is shown a frame 1 of a watthour meter of usual construction to which is secured a register comprising the supporting plates 2, 3 and 4 suitably secured in spaced relation.

The shaft 5 of the well-known rotor or armature of a watthour meter has fixed thereto the worm 6 meshing with the worm wheel 7 on the shaft 8 rotatably mounted in a bracket on the frame of the meter. Fixed to the shaft 8 is the arm 9 adapted, as the shaft rotates, to come against a crank arm 10 fixed upon the shaft 11 rotatably mounted in the plates 2 and 3. This connection between the arm 9 and crank 10 insures the rotational driving of the shaft 11 with the shaft 8 but permits the register to be readily removed from the meter, the crank 10 and arm 9 separating without unfastening any securing devices, while they may be again placed in operative relationship by simply placing the register in position upon the meter frame.

Fixed upon the shaft 11 is a gear 12 meshing with a gear 13 fixed upon the shaft 14 which is rotatably mounted in the plates, 2, 3 and 4. Upon the shaft 14 is fixed the units index hand 15 of the usual kilowatt hour meter moving over the dial 16. Also fixed upon the shaft 14 is a gear 17 meshing with a gear 18 fixed upon a shaft 19 rotatably mounted in the plates 3 and 4 and having fixed upon it the usual "tens" index hand 20 moving over the dial 21. Also fixed upon the shaft 19 is a gear 17' meshing with a gear 23 fixed upon the shaft 24 rotatably mounted in the plates 3 and 4 and having also fixed upon it the "hundreds" index hand 25 moving over the dial 26. Also fixed upon the shaft 24 is a gear 22 meshing with a gear 28 fixed upon the shaft 29 rotatably mounted in the plates 3 and 4 and having fixed upon it the "thousands" index hand 30 moving over the dial 31.

The operation of the meter motor shaft 5 in accordance with the flow of electricity through the meter causes the movement of the index hands 15, 20, 25 and 30 over their respective dials so as to register the integration of the watthours of electricity flowing through the meter in a well known manner.

Also fixed upon the shaft 14 is a gear 32 meshing with an idler gear 33 which in turn meshes with a gear 34 fixed upon the sleeve 35 rotatably mounted on the reduced end of shaft 36 mounted in the plates 3 and 4. Fixedly secured to the sleeve 35, as by being integrally formed therewith, is a disk 38 having a shoulder 39.

Into the path of the shoulder as the disk 38 rotates projects a pin 40 mounted in the dog 41 pivoted to the disk 42 and normally held against the stop pin 43 in the disk by means of a spring 44, said disk 42 being fixed upon a sleeve 45 which in turn is fixed to the shaft 36 by means of a set screw or in other suitable ways.

Loosely mounted upon the shaft 36 is a spur gear 46 which is frictionally held to rotate with the shaft by means of a spring washer 47 bearing against the sleeve 45 and the side of the gear 46 whereby the gear is frictionally gripped between the spring washer and the plate 48 fixed upon the shaft 36 and so is held in non-positive driving relation to the shaft. Fixed upon the shaft 36 is the pointer 49.

Assuming that the disk 38 is stationary, it will be apparent that the turning of the disk 42 in one direction will cause the pin 40 to engage the shoulder 39, thereby preventing further relative turning in that direction. However, because the periphery of the disk 38 rises smoothly and gradually to the outer end of the shoulder 39, the pin 40 rises against the pressure of the spring 44 and rides over the shoulder 39 when the disk 38 is rotated further as a result of the passage of additional electricity through the meter motor.

It will now be apparent that when the shoulder 39 has assumed a certain angular position about the shaft 36 in accordance with the sum or integration of the watthours of electricity passing through the meter motor, the indicator pointer 49 may be moved into a position to indicate or register such sum or integration of the watthours of current passing through the meter by turning the shaft 36 in a direction to bring the pin 40 against the shoulder 39 which may be accomplished through the gear 46 frictionally connected as described with the shaft and disk 42 on which the pin 40 is mounted. The pointer 49 moves over a dial 50 suitably calibrated to indicate the sum of kilowatt hour units as represented by the angular position of the shoulder 39 about the center of the shaft 36.

It will further be apparent that the disk 38 may turn indefinitely in the direction of rotation in which it is driven by the meter motor without the shoulder 39 coming into driving engagement with the pin 40 so that the pointer 49 will remain undisturbed, but that any time it is desired to make manifest by the pointer 49 and dial 50, the kilowatt hours as indicated by the angular position of the shoulder 39, the pin 40 may be brought into engagement with the shoulder 39 by turning the disk 42 in the same direction that the disk 38 is driven by the meter motor when the pointer or indicator 49 will give a reading of the units of kilowatt hours of electricity which have passed through the meter motor.

It is customary, if not necessary, in integrating meters that one indicator and dial indicates units, another indicator and dial indicates tens, another indicator and dial indicates hundreds and another indicator and dial indicates thousands of the units to be measured and the various pointers are suitably geared together to accomplish this result. Accordingly, in order to provide this "tens," "hundreds" and "thousands," the gear 37 meshes with a gear 51 fixed upon a sleeve 52 similar to the sleeve 35 loosely mounted upon the shaft 53 similar to the shaft 36 rotatably mounted in the plates 3 and 4. Fixed to the sleeve 52 is a disk 54 having a shoulder 55 adapted when moved in one direction to engage the pin 56 mounted in a pivoted spring-pressed dog on the disk 57 fixed to the sleeve 58 fixed on the shaft 53, a spur gear 59 being rotatably mounted on the shaft 53 but frictionally secured thereby by the spring washer 60 interposed between the sleeve 58 and the gear 59 which serves to frictionally clamp the gear against the plate 61 fixed on the shaft 53. The indicator pointer or needle 62 is fixed upon the shaft 53 and moves over the dial 54' on the outer face of the plate 4. The construction and arrangement of the parts upon the shaft 53 as referred to is similar to the arrangement of the like parts upon the shaft 36 except that the shoulder 55 faces oppositely to the shoulder 39 so that the direction of relative movement of the pin and shoulder whereby engagement is caused, is opposite.

Also fixed upon the sleeve 52 is a gear 63 meshing with a gear 64 fixed upon a sleeve 65 rotatably mounted upon a shaft 66 to which is fixed the "hundreds" indicating pointer 67 moving over the dial 68 on the outer face of the plate 4. Like the similar construction and relationship of parts on the shaft 36 as described, the sleeve 65 has fixed to it a disk 69 having a shoulder 70 adapted to come into driving engagement with the pin 71 mounted in the spring-pressed pivoted dog 72 mounted upon the disk 73 fixed to the sleeve 74 fixed to the shaft 66, and gear 75 loosely mounted on the shaft 66 is frictionally secured thereto by the spring washer 78 interposed between the sleeve 74 and the gear and frictionally pressing it against the plate 79 fixed to the shaft 66, the shoulder 70, however, being oppositely faced from the shoulder 55 so that the pin 71 and shoulder 70 are engaged by relative turning in the opposite direction.

Also fixed upon the sleeve 65 is a spur gear 80 meshing with the gear 81 fixed upon a sleeve 82 rotatably mounted on the shaft 85 which is rotatably mounted in the plates 3 and 4 and adjacent its forward end has fixed to it the "thousands" indicator pointer 86 moving over the dial 87 on the outer face of the plate 4. Fixed to the sleeve 82 is the disk 83 having the shoulder 84 facing oppositely to the shoulder 70, adapted to engage with the pin 88 mounted in the spring-pressed dog 89 pivoted upon the disk 90 fixed upon the sleeve 91 which in turn is fixed to the shaft 85, the spur gear 92 being frictionally secured to the shaft 85 by means of a spring washer 93 frictionally gripping the gear against the plate 94 fixed on the shaft 85, the construction and arrangement of parts mounted on the shaft 85 being similar to the construction and arrangement of the like parts mounted upon the shaft 36 as have been described in detail.

In order to move the pins 40, 56, 71 and 88 into engagement with their respective shoulders 39, 55, 70 and 84, the gear 46 meshes with the gear 59 which in turn meshes with the gear 75 which in turn meshes with the gear 92. Intermeshing with the gear 75 is a spur gear 95 fixed upon the shaft 96 rotatably mounted in the plates 3 and 4. Also meshing with the gear 95 is a spur gear 97 loosely mounted upon the shaft 98. Fixed to the gear 97 and rotatable therewith is a ratchet wheel 99 with which engages the pawl 100 pivoted on the disk 101 fixed upon the shaft 98, the pawl being spring-pressed toward the ratchet. Fixed to the shaft 98 is an operating arm or handle 103 which in its normal position is against the stop pin 104 in the plate 4, but when turned in a counter-clockwise direction (see Fig. 1) the gear 97 is turned in that direction and through the gear 95, the gears 46, 59, 75 and 92 are turned in such directions respectively as to bring the pins 40, 56, 71 and 88 against the respective shoulder 39, 55, 70 and 84.

It will be seen that the arm 103 may be moved through substantially a complete revolution and the gear ratios are such that each of the shafts 36, 53, 66 and 85 will move through at least one revolution. When the arm 103 has been moved to move the pins (and correspondingly move the indicator pointers 49, 62, 67 and 86), and has been released, the arm 103 and with it the plate 101 and pawl 100 will be returned to their initial position by means of the gear 105 fixed on the shaft 98 with which meshes the gear teeth of a segment 106 pivoted upon the shaft 107 mounted in the plates 3 and 4, a spring 108 secured at one end to a pin 109 in the gear segment and at its other end to the pin 110 in the plate 3 tending to return the arm 103 to its initial position against the stop 104.

Fixed to the gear 95 is a ratchet wheel 111 adapted to be engaged by the spring-pressed pawl 112 pivoted upon the plate 4. This permits the movement of the gear 95 in one direction only, namely that in which it is moved by the movement of the arm 103 in a counter-clockwise direction (see Fig. 1) and which moves the pins 40, 56, 71 and 88 in the same directions respectively as the directions of turning of the shoulders 39, 55, 70 and 84 by the operation of the meter motor.

The gearing is such that the disk 38 will rotate at the same rate of speed as the unit shaft 14, the disk 54 will rotate at the same speed as the shaft 19, the disk 69 will rotate at the same speed as the shaft 24 and the disk 83 will rotate at the same speed as the shaft 29. It therefore follows that the shoulders 39, 55, 70 and 84 will take up positions according respectively to the "units," "tens," "hundreds" and "thousands" of the integrated kilowatt hours of electricity which have passed through the meter.

The pointers 49, 62, 67 and 86 may be moved into positions corresponding to the position of the shoulders, so that the integrated kilowatt hours may be read upon the dials 50, 54', 68 and 87. In moving the pointers into the position as described, the arm 103 is given a complete turn from its position at the right of the stop 104 (see Fig. 1) to the position where it contacts with the left hand side of the stop 104. In so doing as each of the pins 40, 56, 71 and 88 comes against its respective shoulder 39, 55, 70 and 84, further movement of the respective gear 46, 59, 75 and 92 is permitted by reason of the slipping at the frictional connections of the gears and shafts whereby the arm 103 is enabled to make a complete swing from one side of the pin 104 to the other side thereof regardless of the positions in which the pointers 49, 62, 67 and 86 may be stopped by the shoulders 39, 55, 70 and 84.

Figure 1:
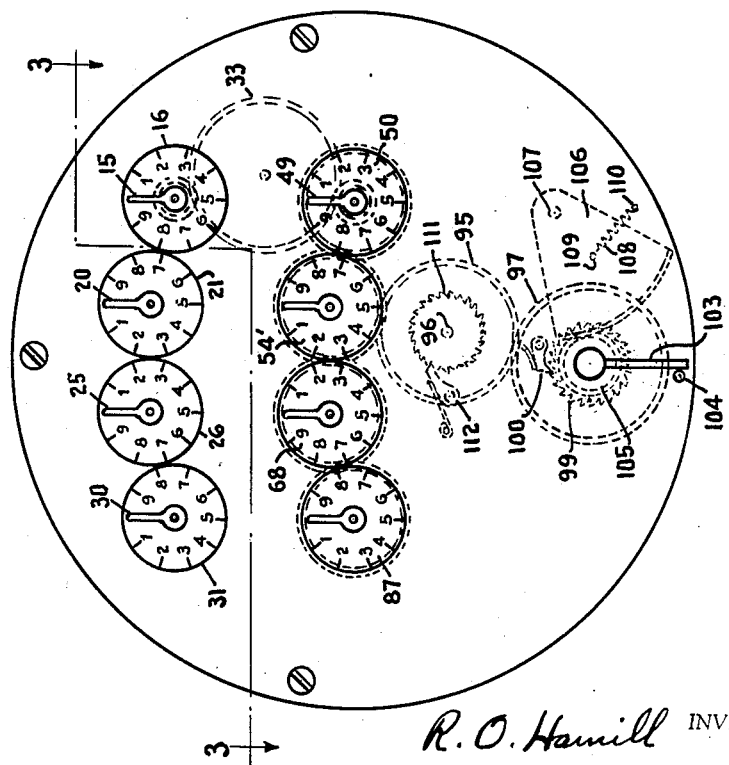
Fig. 1 is a front elevation of an instrument embodying the invention.
Figure 3:
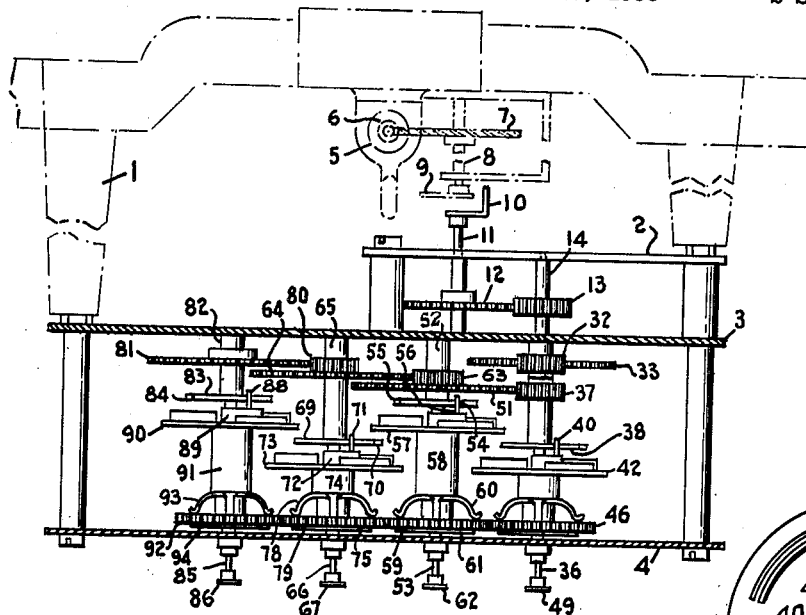
Fig. 3 is a section on the line 3—3 of Fig. 1.
Figure 5:
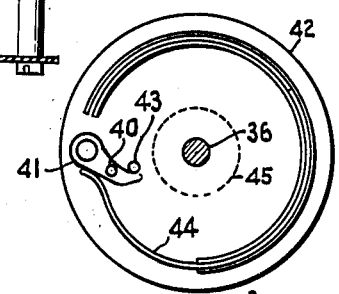
Fig. 5 is a section on the line 5—5 of Fig. 7.
Figure 4:
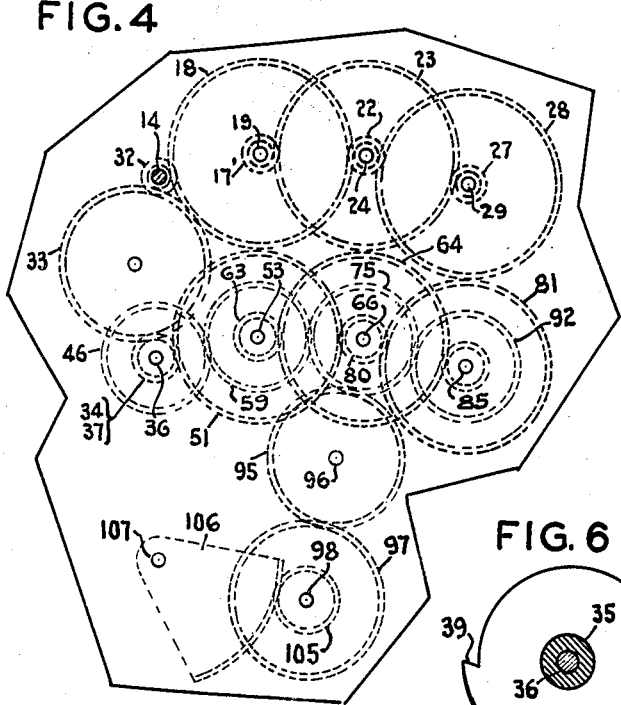
Fig. 4 is a sectional view, on an enlarged scale, partly broken away, on the line 4—4 of Fig. 2.
Figure 7:
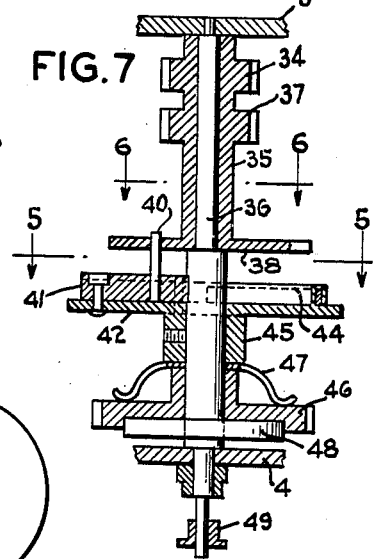
Fig. 7 is a horizontal radial section, on an enlarged scale, through the center of the shaft 36, showing the parts thereon in section.
Figure 6:
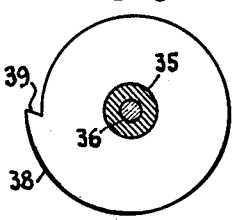
Fig. 6 is a section on the line 6—6 of Fig. 7.

It will now be seen that at any time a reading of the integrated kilowatt hours may be set up upon the dials 50, 54', 68 and 87 by swinging the arm 103 from its position at the right of the stop 104 as shown in Fig. 1 to the left hand side of that stop whereafter the arm 103 will be automatically returned to its initial position and the setting of the pointers 49, 62, 67 and 86 will remain until the arm 103 is again swung at a later time to give a new reading of integrated kilowatt hours.

It will be observed that a setting of the pointers over the dials 50, 54', 68 and 87 having been made as described, the disks 38, 54, 69 and 83 may continue their movement indefinitely in response to the action of the meter motor without engaging in driving relation with the pointers 49, 62, 67 or 86, the pins riding over the shoulders on their corresponding disks without such engagement and the pointers being left in the position to which they have been set as described.

It is thus possible to, at any time desired, set up on the dials 50, 54', 68 and 87 a reading of the integration of the kilowatt hours demand through the meter, and this by simply turning each of the pointers through a fraction of a revolution sufficient to bring it into a position according to the angular position of its corresponding stop shoulder driven by the meter motor whereby the time and extent of movement of the parts is made very small which is of advantage in facilitating the operation and accuracy of the device. Also there is provided a means whereby a reading of the integrated kilowatt hours set up at a given time remains until a different setting is effected so that an indication or reading may at one time be preserved for reference at a future time, which in many cases is desirable, for instance where the meter is read say once a month if the hands are at the beginning of a month set as described to give a reading of the integrated kilowatt hours on the dials 50, 54', 68 and 87, that reading will remain during the following month, so that it can be observed at any time up to the beginning of the next month when the pointers will be again reset to accord with the new reading at the beginning of that month. This preservation of a reading until a reading for the next month is of importance in connection with the check up etc. in connection with practical metering.

While the invention has been illustrated in what are considered its best applications it may have other embodiments without departing from its spirit and is not limited to the structures shown in the drawings.

What I claim is:

1. An indicating device for indicating a measurement comprising, in combination, means actuated by the agency in relation to which the measurement is made, a uni-directionally movable member the position of which is controlled by said means and which is adapted to take up its position according to the measurement to be made; and indicating means including a movable indicator for indicating said measurement, and a scale adjacent to which said indicator moves, said indicator being movable independently of said uni-directionally movable member at all times except when the position thereof corresponds to that of said uni-directionally movable member but engageable therewith to stop said indicator in such position as to indicate the desired measurement.

2. An indicating device for indicating a measurement comprising, in combination, a uni-directionally rotatable member taking up its position according to the measurement made; and indicating means including a rotatable indicator for indicating said measurement, and a scale adjacent to which said indicator rotates, said indicator being rotatable independently of said uni-directionally rotatable member at all times except when the position thereof corresponds to that of said uni-directionally rotatable member but engageable therewith to stop said indicator in such position as to indicate the desired measurement.

3. An indicating device for indicating a measurement comprising, in combination, a uni-directionally movable member taking up its position according to the measurement made; and indicating means including a movable indicator for indicating said measurement, and a scale adjacent to which said indicator moves, said indicator being movable independently of said uni-directionally movable member at all times except when the position thereof corresponds to that of said uni-directionally movable member but engageable therewith only when moved in the same direction to stop said indicator in such position as to indicate the desired measurement.

4. An indicating device for indicating a measurement comprising, in combination, a movable member taking up its position according to the measurement made; indicating means including a movable indicator for indicating said measurement, and a scale adjacent to which said indicator moves in a forward direction, said indicator being movable independently of said movable member at all times except when the position thereof corresponds to that of said movable member but engageable therewith to stop said indicator in such position as to indicate the desired measurement; and means preventing movement of said indicating means in a reverse direction.

5. An indicating device for indicating a measurement comprising, in combination, a uni-directionally movable member taking up its position according to the measurement made; indicating means including a movable indicator for indicating said measurement, and a scale adjacent to which said indicator moves, said indicator being movable independently of said uni-directionally movable member at all times except when the position thereof corresponds to that of said uni-directionally movable member but engageable therewith to stop said indicator in such position as to indicate the desired measurement; and means for moving said indicator into engagement with said uni-directionally movable member.

6. An indicating device for indicating a measurement comprising, in combination, a uni-directionally movable member taking up its position according to the measurement made; indicating means including a movable indicator for indicating said measurement, and a scale adjacent to which said indicator moves, said indicator being movable independently of said uni-directionally movable member at all times except when the position thereof corresponds to that of said uni-directionally movable member but engageable therewith to stop said indicator in such position as to indicate the desired measurement; and means for moving said indicator into engagement with said uni-directionally movable member including non-positive driving means whereby said means for moving said indicator is always operable throughout the same extent for effecting movement of said indicator through varying extents of movement.

7. An indicating device for indicating a measurement comprising, in combination, a movable member taking up its position according to the measurement made; indicating means including a movable indicator for indicating said measurement, and a scale adjacent to which said indicator moves, said indicator being movable independently of said movable member but engageable therewith to stop said indicator in such position as to indicate the desired measurement, means having an initial position for moving said indicator into engagement with said movable member; and means for automatically returning said indicator moving means to its initial position after it has been operated to move said indicator.

8. An indicating device for indicating a measurement comprising, in combination, a plurality of movable members taking up their positions according to the measurement made; indicating means corresponding to each of said movable members, each of said indicating means including a movable indicator for indicating said measurement, and a scale adjacent to which the indicator moves, the indicators being movable independently of said movable members but engageable therewith to stop said indicators in such positions as to indicate the desired measurement, said indicators engaging with said movable members respectively only when moved in the same direction respectively as their corresponding movable members are moved; and means common to all said indicators for moving the same into engagement with said movable members.

9. An indicating device for indicating a measurement comprising, in combination, a plurality of rotatable members taking up their positions according to the measurement made; indicating means corresponding to each of said rotatable members, each of said indicating means including a rotatable indicator for indicating said measurement, and a scale adjacent to which the indicator rotates, the indicators being rotatable independently of said rotatable members but engageable therewith to stop said indicators in such positions as to indicate the desired measurement, said indicators engaging with said rotatable members respectively only when rotated in the same direction respectively as their corresponding rotatable members are moved; means common to all said indicators for rotating the same into engagement with said rotatable members, and non-positive driving means operatively interconnecting said common means with each of said indicators whereby said common means is always operable throughout the same extent for effecting movement of said indicators through varying and different extents of movement.

10. An indicating device for indicating a measurement comprising, in combination, means actuated by the agency in relation to which the measurement is made, a uni-directionally movable member the position of which is controlled by said means and which is adapted to take up its position according to the measurement to be made; and indicating means including a movable indicator for indicating said measurement, and a scale adjacent to which said indicator moves, said indicator being movable independently of said uni-directionally movable member but engageable therewith to stop said indicator in such position as to indicate the desired measurement, the engagement of said indicator and member being for one direction of movement of said indicator and permitting free movement of said member in the same direction.

11. An indicating device for indicating a measurement comprising, in combination, a plurality of members rotatable at different speeds and taking up their positions according to the measurement made; indicating means corresponding to each of said members, each of said indicating means including a rotatable indicator for indicating said measurement, and a scale adjacent to which the indicator rotates, each indicator being rotatable independently of its corresponding member but engageable therewith to stop the indicators in such positions as to indicate the desired measurement, and means arranged and adapted to simultaneously rotate each indicator at the same speed into engagement with its corresponding member.

12. An indicating device for indicating a measurement comprising, in combination, a plurality of movable members taking up their positions according to the measurement made; indicating means corresponding to each of said movable members, each of said indicating means including a movable indicator for indicating said measurement, and a scale adjacent to which the indicator moves, the indicators being movable independently of said movable members but engageable therewith to stop said indicators in such positions as to indicate the desired measurement, said indicators engaging with said movable members respectively only when moved in the same direction respectively as their corresponding movable members are moved; means having an initial position and common to all said indicators for moving the same into engagement with said movable members, and means for automatically returning said common means to its initial position after it has been operated to move said indicators.

13. An indicating device for indicating a measurement comprising, in combination, a plurality of members each driven by the preceding member at successively slower speeds and taking up their positions according to the measurement made; indicating means individual to each of said members and each including an indicator for indicating said measurement, and a scale adjacent to which the indicator moves, each indicator being movable independently of its said member but engageable therewith to stop the indicators in such positions as to indicate the desired measurement; and means arranged and adapted to simultaneously move each indicator at the same speed into said engagement with its said member.

RET O. HAMILL.